(12) United States Patent
Maze

(10) Patent No.: US 10,536,459 B2
(45) Date of Patent: Jan. 14, 2020

(54) DOCUMENT MANAGEMENT SYSTEMS AND METHODS

(71) Applicant: Gary Robin Maze, Pearland, TX (US)

(72) Inventor: Gary Robin Maze, Pearland, TX (US)

(73) Assignee: KPTools, Inc., Houston, TX (US)

( * ) Notice: Subject to any disclaimer, the term of this patent is extended or adjusted under 35 U.S.C. 154(b) by 307 days.

(21) Appl. No.: 15/375,276

(22) Filed: Dec. 12, 2016

(65) Prior Publication Data

US 2017/0195333 A1  Jul. 6, 2017

Related U.S. Application Data

(63) Continuation of application No. 14/547,001, filed on Nov. 18, 2014, now Pat. No. 9,552,369, and a continuation of application No. 13/646,541, filed on Oct. 5, 2012, now Pat. No. 8,924,443.

(51) Int. Cl.
| | |
|---|---|
| *H04L 29/06* | (2006.01) |
| *G06F 16/182* | (2019.01) |
| *G06F 16/93* | (2019.01) |
| *G06F 21/62* | (2013.01) |
| *G06F 16/23* | (2019.01) |
| *G06F 16/18* | (2019.01) |

(52) U.S. Cl.
CPC ............ *H04L 63/10* (2013.01); *G06F 16/182* (2019.01); *G06F 16/183* (2019.01); *G06F 16/1873* (2019.01); *G06F 16/23* (2019.01); *G06F 16/93* (2019.01); *G06F 21/6218* (2013.01)

(58) Field of Classification Search
CPC ... H04L 63/10; G06F 16/1873; G06F 16/183; G06F 16/93; G06F 16/182; G06F 16/23; G06F 21/6218

USPC ......................................................... 707/827
See application file for complete search history.

(56) References Cited

U.S. PATENT DOCUMENTS

| | | | | |
|---|---|---|---|---|
| 5,926,805 | A * | 7/1999 | Hurvig ................. | G06F 16/166 707/690 |
| 6,374,402 | B1 * | 4/2002 | Schmeidler ............ | G06F 21/10 348/E5.008 |
| 6,763,370 | B1 * | 7/2004 | Schmeidler ............ | G06F 21/10 348/E5.008 |

(Continued)

FOREIGN PATENT DOCUMENTS

KR        20100003406 A  *  1/2010

OTHER PUBLICATIONS

Welch et al., "Pseudo Devices: User-Level Extensions to the Sprite File System", in Proceedings of the USENIX Summer Conference, 1988, 15 pages. (Year: 1988).*

*Primary Examiner* — Phuong Thao Cao
(74) *Attorney, Agent, or Firm* — Maze IP Law, P.C.

(57) ABSTRACT

A system for managing files over a network comprises a first computer hosting managed folders and files and one or more second computers. The first computer comprises database management software, server software such as server pipe software, and a first unique token. The second computer comprises a software module adapted and configured to be integrated into application software, client software such as client pipe software, and a second unique token. The computers communicate in part using the server and client software to establish a secure session for file access and transfer between the first and second computers.

19 Claims, 4 Drawing Sheets

(56) References Cited

U.S. PATENT DOCUMENTS

Figure 1:
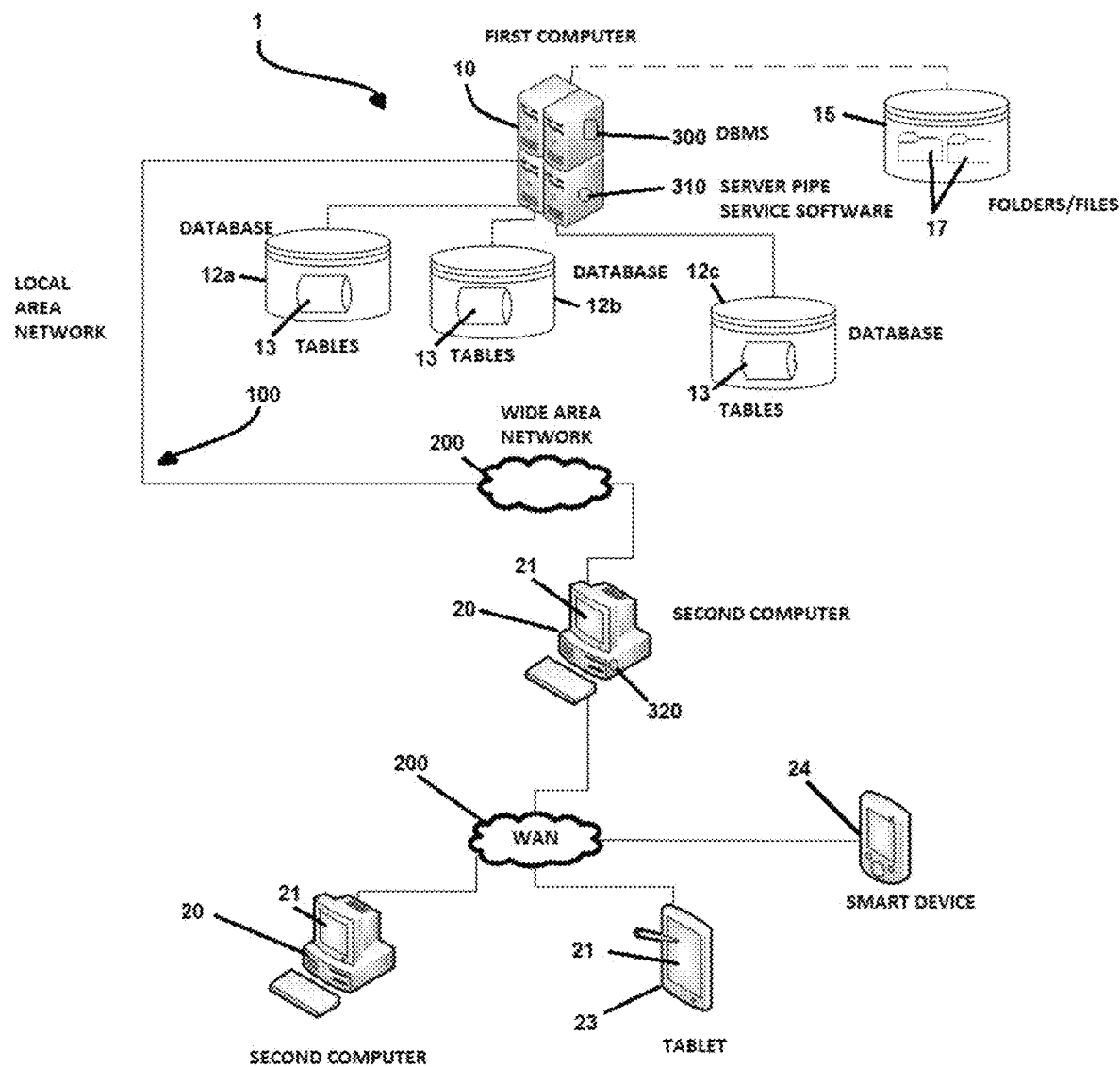

| | | | | |
|---|---|---|---|---|
| 6,785,812 B1* | 8/2004 | Botham, Jr. | H04L 63/08 | 713/150 |
| 6,856,989 B1* | 2/2005 | Zhou | G06F 16/972 | |
| 6,954,753 B1* | 10/2005 | Jeran | G06F 21/6218 | |
| 7,017,188 B1* | 3/2006 | Schmeidler | G06F 21/10 | 705/57 |
| 7,136,903 B1* | 11/2006 | Phillips | G06F 16/10 | 709/217 |
| 7,200,622 B2* | 4/2007 | Nakatani | H04L 67/1097 | 707/823 |
| 7,493,514 B2* | 2/2009 | Soran | G06F 3/0608 | 714/6.22 |
| 7,603,533 B1* | 10/2009 | Tsypliaev | G06F 21/575 | 709/217 |
| 7,661,036 B1* | 2/2010 | Clingenpeel | G06F 11/3476 | 714/37 |
| 7,729,995 B1* | 6/2010 | Alain | G06F 21/6209 | 705/64 |
| 7,774,391 B1* | 8/2010 | Le | G06F 16/13 | 707/822 |
| 7,844,757 B2* | 11/2010 | Mani | G06F 11/0712 | 710/36 |
| 7,853,962 B1* | 12/2010 | Romano | G06F 9/547 | 709/203 |
| 7,873,700 B2* | 1/2011 | Pawlowski | G06F 3/0607 | 709/213 |
| 7,953,948 B1* | 5/2011 | Dyatlov | G06F 11/1435 | 709/217 |
| 8,122,122 B1* | 2/2012 | Clingenpeel | G06F 21/552 | 709/203 |
| 8,180,813 B1* | 5/2012 | Goodson | G06F 16/907 | 707/827 |
| 8,484,259 B1* | 7/2013 | Makkar | G06F 16/907 | 707/827 |
| 8,589,550 B1* | 11/2013 | Faibish | G06F 3/067 | 707/E17.01 |
| 8,789,156 B2* | 7/2014 | Fisk | G06F 21/6245 | 726/7 |
| 8,832,030 B1* | 9/2014 | Buchman | G06F 11/1451 | 707/650 |
| 8,931,054 B2* | 1/2015 | Huynh | G06F 3/0622 | 380/44 |
| 9,003,491 B2* | 4/2015 | Herzog | H04L 51/38 | 380/229 |
| 9,183,065 B1* | 11/2015 | Shanker | G06F 9/544 | |
| 9,231,949 B1* | 1/2016 | Jenkins | H04L 63/0807 | |
| 9,244,969 B1* | 1/2016 | Love | G06F 16/24 | |
| 9,485,233 B1* | 11/2016 | Basha P. R. | H04L 63/08 | |
| 9,729,515 B1* | 8/2017 | Anantharaju | H04L 63/04 | |
| 10,102,080 B1* | 10/2018 | Gruszka | G06F 11/1453 | |
| 10,173,008 B2* | 1/2019 | Simpson | G06F 19/3418 | |
| 2001/0047482 A1* | 11/2001 | Harris | G06F 11/0727 | 726/26 |
| 2003/0041097 A1* | 2/2003 | Tormasov | G06F 16/1865 | 709/201 |
| 2003/0061509 A1* | 3/2003 | Fisher | G06F 21/31 | 726/5 |
| 2004/0010724 A1* | 1/2004 | Brown | G06F 21/32 | 713/186 |
| 2004/0030926 A1* | 2/2004 | Clark | H04L 63/0428 | 726/1 |
| 2004/0049697 A1* | 3/2004 | Edwards, Jr. | G06F 21/31 | 726/5 |
| 2004/0059822 A1* | 3/2004 | Jiang | H04L 67/1097 | 709/230 |
| 2004/0088646 A1* | 5/2004 | Yeager | H04L 29/06 | 715/229 |
| 2004/0133544 A1* | 7/2004 | Kiessig | G06F 16/10 | |
| 2004/0177265 A1* | 9/2004 | Ice, Jr. | G06F 21/31 | 713/2 |
| 2005/0235005 A1* | 10/2005 | Aono | G06F 16/188 | |
| 2006/0031407 A1* | 2/2006 | Dispensa | H04L 29/12009 | 709/219 |
| 2006/0122955 A1* | 6/2006 | Bethlehem | H04L 63/102 | |
| 2006/0236054 A1* | 10/2006 | Kitamura | G06F 3/0605 | 711/165 |
| 2007/0040021 A1* | 2/2007 | Nakayma | G06F 12/1408 | 235/380 |
| 2007/0156897 A1* | 7/2007 | Lim | G06Q 10/10 | 709/225 |
| 2007/0162749 A1* | 7/2007 | Lim | G06F 21/6227 | 713/167 |
| 2007/0233647 A1* | 10/2007 | Rawat | G06F 21/6218 | |
| 2007/0294456 A1* | 12/2007 | Chan | H04L 12/66 | 710/313 |
| 2008/0022373 A1* | 1/2008 | Takahashi | G06F 21/6209 | 726/4 |
| 2008/0060080 A1* | 3/2008 | Lim | H04L 63/20 | 726/26 |
| 2008/0072002 A1* | 3/2008 | Kuwahara | G06F 11/1456 | 711/162 |
| 2008/0134347 A1* | 6/2008 | Goyal | G06F 21/6209 | 726/29 |
| 2008/0168275 A1* | 7/2008 | De Atley | G06F 21/51 | 713/189 |
| 2008/0168310 A1* | 7/2008 | Saretto | G06F 11/2284 | 714/30 |
| 2008/0235300 A1* | 9/2008 | Nemoto | G06F 16/119 | |
| 2009/0222928 A1* | 9/2009 | Yano | G03G 15/5075 | 726/26 |
| 2009/0265471 A1* | 10/2009 | Li | H04W 4/50 | 709/227 |
| 2009/0313401 A1* | 12/2009 | Mani | G06F 11/0712 | 710/38 |
| 2009/0319661 A1* | 12/2009 | Shiozawa | H04L 9/12 | 709/225 |
| 2010/0017374 A1* | 1/2010 | Bae | G06F 21/6218 | 707/E17.005 |
| 2010/0036817 A1* | 2/2010 | Bae | G06F 21/6218 | 707/781 |
| 2010/0082716 A1* | 4/2010 | Agetsuma | G06F 16/10 | 707/827 |
| 2010/0082734 A1* | 4/2010 | Elcock | H04L 63/08 | 709/203 |
| 2010/0082793 A1* | 4/2010 | Woods | G06F 3/0617 | 709/223 |
| 2010/0082914 A1* | 4/2010 | Suzuki | G06F 16/13 | 711/154 |
| 2010/0083386 A1* | 4/2010 | Kline | G01R 31/31705 | 726/34 |
| 2010/0100524 A1* | 4/2010 | Bae | H04L 63/10 | 707/609 |
| 2010/0115008 A1* | 5/2010 | Nakatani | G06F 16/119 | 707/823 |
| 2010/0144314 A1* | 6/2010 | Sherkin | G06F 21/33 | 455/411 |
| 2010/0154053 A1* | 6/2010 | Dodgson | G06F 21/78 | 726/19 |
| 2010/0268757 A1* | 10/2010 | Fisher | G06F 16/95 | 709/203 |
| 2010/0325424 A1* | 12/2010 | Etchegoyen | H04L 63/0853 | 713/155 |
| 2011/0040812 A1* | 2/2011 | Phillips | G06F 9/45541 | 707/822 |
| 2011/0055299 A1* | 3/2011 | Phillips | G06F 9/45533 | 707/827 |
| 2011/0055908 A1* | 3/2011 | Cheung | G06F 21/34 | 726/5 |
| 2011/0093740 A1* | 4/2011 | Tsao | H04L 67/1097 | 714/4.12 |
| 2011/0113235 A1* | 5/2011 | Erickson | G06F 21/34 | 713/152 |
| 2011/0184993 A1* | 7/2011 | Chawla | G06F 9/45533 | 707/802 |

(56) References Cited

U.S. PATENT DOCUMENTS

| | | | | |
|---|---|---|---|---|
| 2011/0205588 A1* | 8/2011 | Yabe | G06F 3/1213 | 358/1.15 |
| 2011/0251992 A1* | 10/2011 | Bethlehem | H04L 12/2863 | 707/610 |
| 2011/0276806 A1* | 11/2011 | Casper | G06F 21/602 | 713/189 |
| 2011/0314533 A1* | 12/2011 | Austin | H04L 63/08 | 726/9 |
| 2012/0005193 A1* | 1/2012 | Nemoto | G06F 16/185 | 707/722 |
| 2012/0016915 A1* | 1/2012 | Choi | G06F 16/11 | 707/823 |
| 2012/0023567 A1* | 1/2012 | Hammad | G06Q 20/12 | 726/9 |
| 2012/0137098 A1* | 5/2012 | Wang | G06F 3/0617 | 711/165 |
| 2012/0185197 A1* | 7/2012 | Lorden | G01F 9/001 | 702/100 |
| 2012/0204246 A1* | 8/2012 | Pinkas | G06F 21/36 | 726/7 |
| 2012/0233705 A1* | 9/2012 | Boysen | G06F 21/335 | 726/29 |
| 2012/0290455 A1* | 11/2012 | Mays | G06F 9/5072 | 705/34 |
| 2012/0317145 A1* | 12/2012 | Reghetti | G06F 21/6209 | 707/781 |
| 2013/0007465 A1* | 1/2013 | Movassaghi | H04L 63/105 | 713/186 |
| 2013/0024681 A1* | 1/2013 | Gattegno | G06F 8/63 | 713/2 |
| 2013/0117767 A1* | 5/2013 | Myrah | G06F 13/102 | 719/326 |
| 2013/0191883 A1* | 7/2013 | Tung | H04W 12/08 | 726/4 |
| 2014/0101212 A1* | 4/2014 | Maze | H04L 63/10 | 707/827 |
| 2014/0136485 A1* | 5/2014 | Miyoshi | G06F 3/0617 | 707/654 |
| 2014/0207730 A1* | 7/2014 | Spataro | G06F 16/93 | 707/608 |
| 2014/0282897 A1* | 9/2014 | Stuntebeck | H04L 63/08 | 726/4 |
| 2015/0188910 A1* | 7/2015 | Tsai | H04L 63/0823 | 713/175 |
| 2015/0199414 A1* | 7/2015 | Braginsky | G06F 16/172 | 707/613 |
| 2015/0220563 A1* | 8/2015 | Kamei | G06F 3/061 | 707/827 |
| 2015/0350173 A1* | 12/2015 | Tanase | H04L 63/08 | 726/7 |

* cited by examiner

DOCUMENT MANAGEMENT SYSTEMS AND METHODS

RELATION TO PRIOR APPLICATIONS

This application is a continuation of, and claims priority through, U.S. patent application Ser. No. 14/547,001 filed Nov. 18, 2014, which issued as U.S. Pat. No. 9,552,369 on Jan. 24, 2017 and which was a continuation of, and claimed priority through, U.S. patent application Ser. No. 13/646,541 filed Oct. 5, 2012 which issued as U.S. Pat. No. 8,924,443 on Dec. 30. 2014.

FIELD OF THE INVENTION

The inventions described herein relate to computer file management systems, more specifically to computer data and document files, allowing access in a secure and protected manner and allowing for rapid location and retrieval of such files.

BACKGROUND

Network appliances, such as a network attached storage (NAS) device, have been available for a while, but most if not all of these do not provide access to documents in a secure and protected manner or allow for rapid location and retrieval of such files. Instead, the NAS devices enable multiple computers to share the same storage space at once. Thus, these NAS devices implement a data-centric storage model but are more concerned about disk storage space availability than they are about file management.

Enterprise content management (ECM) systems, on the other hand, provide a formalized means of organizing and storing an organization's documents and related content. ECM is an umbrella term covering document management, web content management, search, collaboration, records management, digital asset management (DAM), work-flow management, capture and scanning Enterprise content management, as a form of content management, combines the capture, search, and networking of documents, usually together with digital archiving, document management, and workflow. As part of ECM systems, a document management system (DMS) is used to track and store electronic documents and/or images of paper documents, including a versioning capability (history tracking) The primary reason for a DMS over a file sharing system such as an NAS is to improve the sharing and auditing of business documents.

A problem is that as users continue to use their computer systems, the numbers of files created, accessed, modified, and lost grows. The benefits of data file management systems are well known but many, if not most, of the ECM document management systems are expensive, complicated, or both and most of the NAS devices are not adapted to provide true document management.

DRAWINGS

Figure 2:
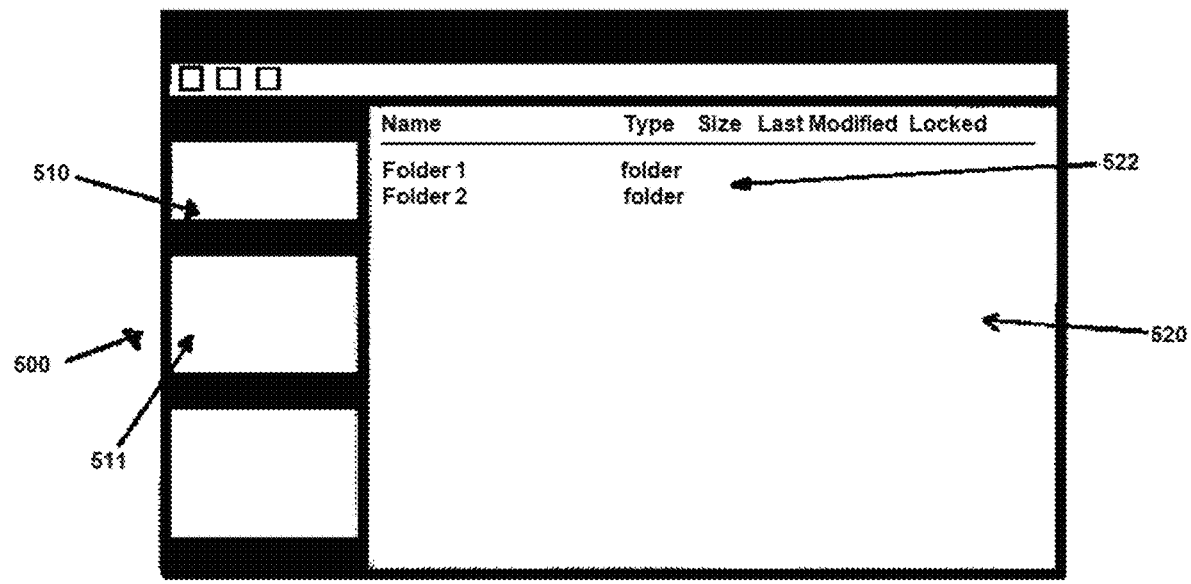
Figure 3:
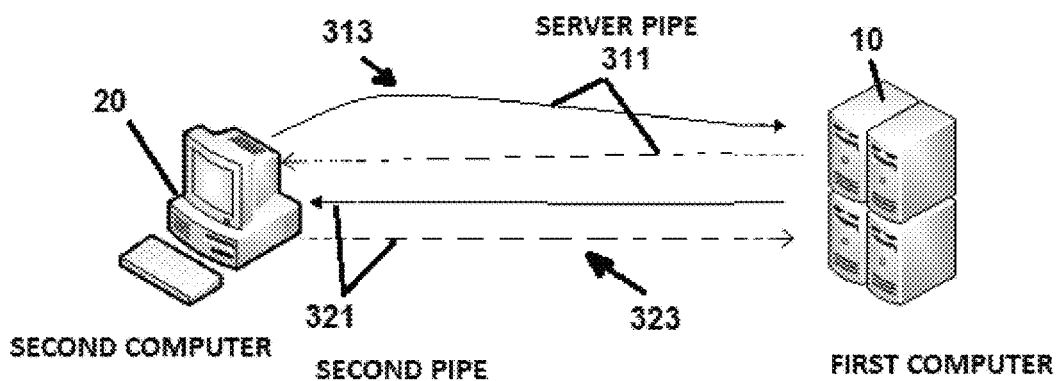
Figure 4:
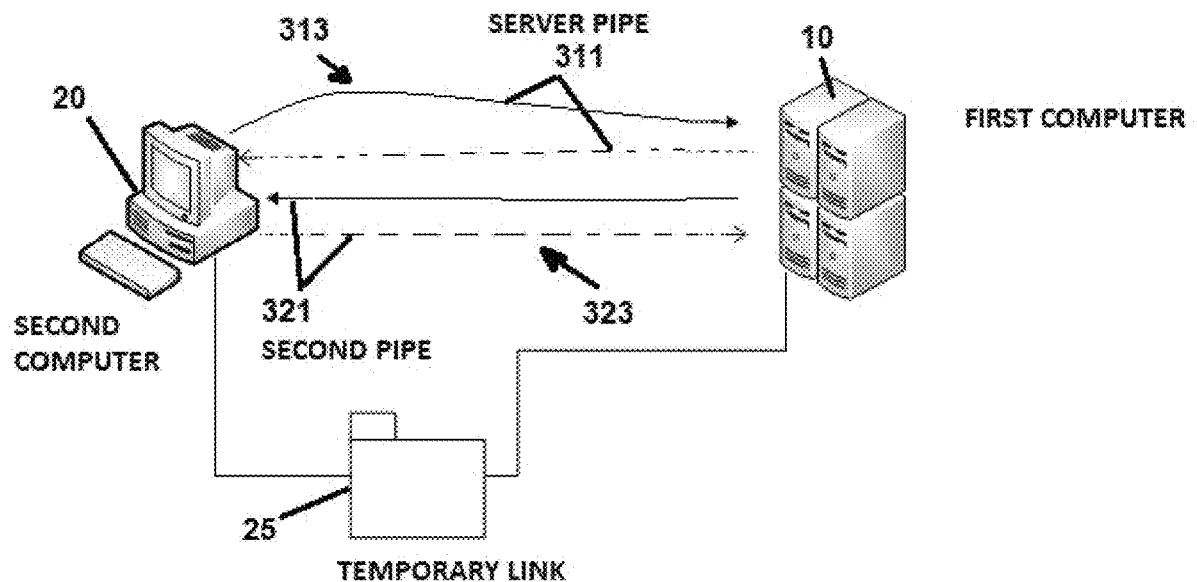
Figure 5:
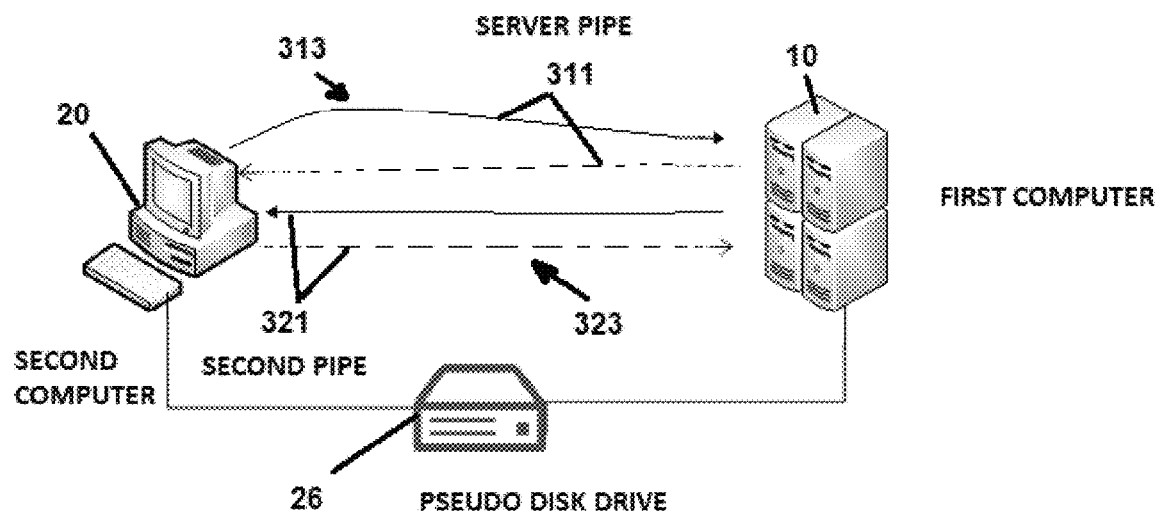
Figure 6:
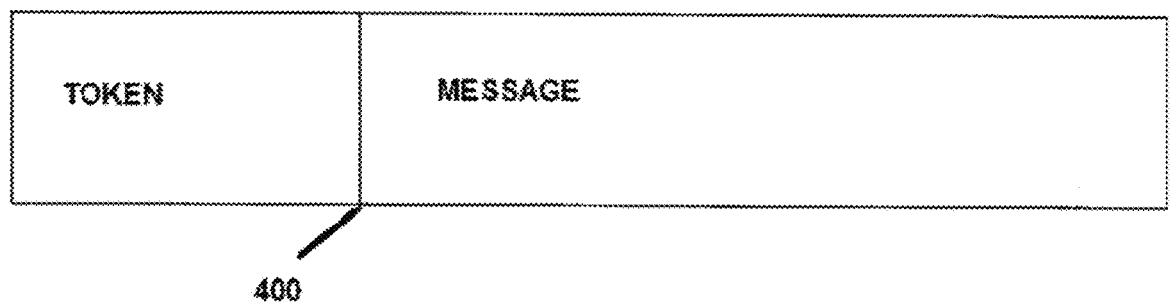
Figure 7:
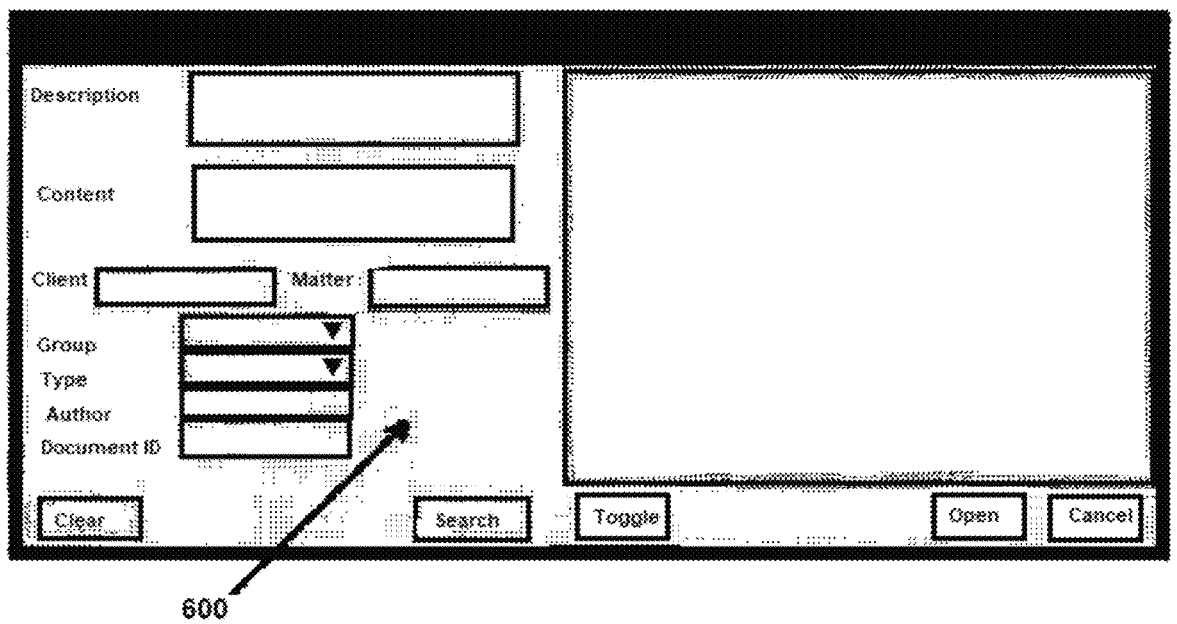

The various drawings supplied herein describe and are representative of exemplary embodiments of the invention and are described as follows:

FIG. 1 is a schematic view of an exemplary system;
FIG. 2 is an exemplary browser view;
FIG. 3 is a schematic view of a first embodiment;
FIG. 4 is a schematic view of a second embodiment;
FIG. 5 is a schematic view of a third embodiment;
FIG. 6 is a box view of an exemplary message; and
FIG. 7 is an exemplary search view.

DESCRIPTION OF PREFERRED EMBODIMENTS

Referring to FIG. 1, system 1 comprises a network attached document management appliance, first computer 10, as well as second computer 20 and local area network (LAN) 100 to which each of first computer 10 and second computer 20 are operatively connected. Each of first computer 10 and second computer 20 further comprises a separate, immutable, queriable, unique identifier that can be used as a token, e.g. a CPU hardware ID or the like. In this way, first computer 10 has its own unique token as does second computer 20.

First computer 10 comprises data store 15, database management software 300, and, in some embodiments, server pipe service software 310. In most configurations, first computer 10 further comprises preconfigured database 12 (12*a*, 12*b*, 12*c*) comprising a preconfigured set of tables 13. Data store 15 is configured and adapted for storing files 17. A predetermined portion of data store 15 is accessible only by software operating in first computer 10 and may be further accessible to other software, e.g. to software in second computer 20, using security provided by the operating system executing in first computer 10. That security can also be used to further isolate and manage access to the predetermined portion of data store 15 by software executing in first computer 10. In certain embodiments, a portion of data store 15 may be generally accessible and first computer 10 may act as a file server as well as a document management system server. However, in each case, the predetermined portion of data store 15 is still accessible only by software operating in first computer 10 and still may be further accessible to other software, e.g. to software in second computer 20, using security provided by the operating system executing in first computer 10.

Second computer 20 comprises application software, e.g. word processors and the like, and, in some embodiments, client pipe service software 320. In certain embodiments, the application software may be specifically tailored to interface with first computer 10 and its software, in the manners described herein below. Access software is typically installed on second computer 20 where the access software is configured and adapted to communicate with first computer 10 when a file operation is desired by second computer 20 with respect to a file to be managed, as described herein below. As used herein, second computer 20 may be a traditional computer such as a desktop or laptop computer; tablet 23; a smart device such as smart phone 24; or any other unit having a processor and display.

For embodiments that include it, server pipe service software 310 is operatively in communication with database management software 300 and can directly access data store 15. Server pipe service software 310 is typically adapted and configured to communicate over local area network 100 using named pipe data transfer and operates server pipe 311 with a predetermined name such as one comprising the name of first computer 10. Similarly, client server service software 320 is adapted and configured to be operatively resident in second computer 20 and to communicate over local area network 100 using named pipe data transfer to and with pipe server service software 310. In most configurations, server pipe service software 310 is preconfigured with at least the token of first computer 10 and server pipe name 313 and client server service software 320 preconfigured with at least server pipe name 313.

In alternative embodiments, a process other than a pipe service may be used, e.g. an interprocess communication (IPC) server and client including TCP/IP based communication servers/clients. These processes may include distributed processes known as Component Object Model (COM) and/or distributed COM (DCOM), dynamic data exchange (DDE), remote procedure calls (RPC), and Windows Sockets as well as named pipes. As is known to those of ordinary skill in these arts, some technologies such as Windows Sockets may require having to assign a port for the local host server.

In the operation of selected embodiments, still referring generally to FIG. 1, in general users of system 1 request a file operation to be performed with respect to a managed folder and/or managed file 17. These file requests typically comprise a request to store file 17 at or retrieve file 17 from first computer 10. The file operation request may also comprise obtaining data related to file 17 to be transferred prior to transferring file 17 to or from first computer 10 and associating the obtained data with file 17 to be transferred. If the file operation request involves storing file 17 at first computer 10, the file operation request operation typically includes storing all or a portion of the obtained data in a searchable record associated with file 17 transferred in table 13 managed by database manager 300.

Each user may be further allowed to create a user taxonomy unique to the user, typically a hierarchical taxonomy separate from a set of global attributes. In these embodiments, each user may be allowed to associate a taxonomy member of the user taxonomy with either a desired managed folder, a desired managed folder item, or both.

A set of preconfigured, related tables 13 are created in database 12 which is managed by database manager 300. The set of related tables 13 typically comprise data regarding each managed folder and each managed folder item, e.g. a set of other folders and/or a set of files 17. Records may be added to set of related tables 13, where these records comprise data sufficient to identify the set of files 17 and/or other folder items having limited accessibility that are to be managed, e.g. file names, file types, client-matter identity associations, and the like, or a combination thereof. A set of managed folders is isolated from direct access by a user of the operating system of first computer 10 and/or second computer 20, such as by using the security system of the operating system. Over time, the managed folders are populated by the set of files 17 having limited accessibility that are to be managed.

A single physical file 17 may be designated as a linked file, in which case the same physical file can be made to appear to be associated with a set of folders, i.e. viewing the contents of Folder "B" may show that it contains File "A" even though File "A" is really located in Folder "A." A user with appropriate permissions may mark a file item as a linked file item, e.g. by having database manager 300 provide a linked file item attribute as part of the set of item attributes, and associate the linked file item with a set of managed folders. This linked file item will then be displayed as a member of each associated member of the set of managed folders, provided view privileges allow such display. A desired file operation may be performed against the linked file item irrespective of the associated managed folder except that deletion of the physical linked file item is allowed only if it is associated with a single managed folder.

A set of users can be created at system installation time but the creation can be at any time before and/or after installation as well. Each user may be assigned a set of permissions where the permissions may comprise a read permission, a write permission, a delete permission, a move permission, an import permission, an export permission, and a view permission, or the like, or a combination thereof, each of which can be to either allow the operation or deny the operation.

Referring additionally to FIG. 2, one way for a user to access the managed folders and files 17 is via browser display 500 shown on display screen 21 (FIG. 1) at second computer 20 (FIG. 1), where browser display 500 comprises a file item browsing form comprising folder panel 510 and file panel 520. Folder panel 510 comprises a list of managed folders in first predetermined portion 511 of browser display 500 and file panel 520 comprises a list of contents of a currently selected managed folder of the list of managed folders, if any, in second predetermined portion 522 of browser display 21. A user may select a managed folder visible in folder panel 510 to view a list of that managed folder's contents if the user has appropriate permissions for that folder and may then be allowed to request a file operation on a selected file item 15 associated with the selected managed folder, again if the user has appropriate permissions for that file. In addition, a user may locate a managed folder and/or file by using a searching form 600 (FIG. 7) which provides search criteria entries.

In certain embodiments, a system manager and/or a user can create a link or set of links to a client-matter related folder or subfolder. This shortcut can be presented to the user via an interface such as the browser interface in FIG. 2. In this manner, the user can rapidly access files for which the user has adequate permissions as opposed to either searching using search 600 form or using a browser-like interface such as browser form 500 to home in on those files.

Using either browser form 500 or search 600 form the user may optionally be presented with a set of filtering criteria and the managed file items displayed in the file panel are limited to those which meet the filtering criteria.

In any of these embodiments, data transfers between first computer 10 and second computer 20 may involve encrypting the data to be transferred, e.g. using server pipe service token 312, client pipe service software 320 token, or both as keys for encryption/decryption. The file operation may comprise a read request, a write request, a directory request, a file information request, a delete request, or the like, or a combination thereof. For example, the predetermined, specific file operation may comprise a request to store file 17 at first computer 10, and data related to file 17 to be stored at first computer 10 is obtained prior to transferring file 17 to first computer 10. Whether the data are obtained at first computer 10 or second computer 20, the obtained data are associated with the file to be stored at first computer 10 and stored in a searchable record associated with the file to be stored at first computer 10 in one or more tables 13 managed by database manager 300.

Additionally, data may be obtaining related to the data to be transferred prior to the data transfer and the obtained data associated with the data to be transferred. These obtained data may be stored in a searchable record associated with the data transferred in table 13 which managed by database manager 300.

Upon successful complete of the data transfer, one or more tables 13 controlled by database manager 300 are updated with a predetermined set of file data related to the data transfer. Updates of the data in tables 13 may be controlled by database manager 300 by creating a new record in table 13 if the file data do not currently exist in table 13 or updating an existing record which is associated with the file data in table 13 with a predetermined set of data.

Once the file operation is successfully completed, for file creations and/or updates first computer 10 can create file 17 with the file name at predetermined file location using the received data. If table 13 is not updated successfully or if file 32 is not created successfully, created file 17 is typically deleted.

In these various embodiments, text content, if any, may be extracted from the data in file 17 to be transferred and stored in a text searchable record associated with the data transferred in table 13 managed by database manager 300. These may be text that are associated with and/or embedded within file 17, e.g., a word processing, spreadsheet, presentation, email, or other files. The text content may be extracted from the data to be transferred prior to or after transferring the data. If prior to, the extracted text content may be part of in the data to be transferred. If after, text may be extracted at first computer 10 at one or more predetermined intervals.

In certain embodiments, the data to be transferred are encrypted by the sender, e.g. software executing in second computer 20, and decrypted by the receiver, e.g. software executing in first computer 10, using server pipe service token 312, client pipe service software 320 token, or a combination thereof as the encryption key or part of the encryption key.

In certain embodiments, managed folders, folder items, and their set of item attributes may be pre-existing and imported into system 1. Once imported, these managed folders, folder items, and their set of item attributes will no longer be accessible outside of first computer 10 without using system 1.

A set of item attributes from a set of global item attributes may be assigned to one or more managed folders, e.g. user access rights, read-only attributes, defaults, and the like, or a combination thereof. Each managed folder item may then also be associated with a subset of the set of item attributes and a set of searchable attributes associated with each managed folder item. For example, a user might want to find a set of folders associated with a specific client-matter or a set of folders associated with a specific practice group area or other user defined criterion.

Typically, a set of users is created during system installation such as when software modules (described below) are installed at second computer 20. Each user will have predetermined access to a set of managed folders and managed files. Each user may be assigned a set of permissions such as a read permission, a write permission, a delete permission, a move permission, an import permission, an export permission, and a view permission.

A user may be allowed to specify file versioning, either automatically or manually, where each version of a managed file comprises a physically separate instance of the versioned managed file. Users with adequate permission may also be allowed to specify where a versioned managed file is to be stored, e.g. data store 15, a data store local to second computer 20, a data store accessible over local area network 100, a data store accessible over wide area network 200, or the like, or a combination thereof. Users with adequate permission may be allowed to freeze a version of file 17, including a linked item version of file 17. If so desired, a new copy of the frozen file 17 is created with a new version identified for file 17 and the new copy of file 17 associated with a selected managed folder.

Users with appropriate permission may specify a set of managed folders or files for backup, including specifications of when and where backed up folders and files are to be stored, e.g. a data store local to second computer 20, a data store accessible over local area network 100, a data store accessible over wide area network 200, or the like, or a combination thereof. First computer 10 will then backup the folders and/or files according to the schedule of file item backups.

A set of file operations is captured in an audit table 13 in database 12. These may include requests for operations, actual operations (e.g. read, write, open, close, delete, move), and success/failure status indicators. For example, database 12 is updated to reflect the status of the file operation, e.g. if it was successful or not.

Several differing embodiments will be described below, each of which may further comprise one or more of the aspects described above.

Referring to FIG. 1 and FIG. 3, in a first embodiment files 17 may be managed on a file server such as first computer 10 by initiating database manager 300 at first computer 100 operatively in communication with a data network 100, where first computer 10 comprises data store 15 which stores a set of files 17 having limited accessibility to second computer 20 via data network 100. As will be known to those of ordinary skill in these arts, data network 100 may comprise local area network 100, wide area network 200, a virtual network, a telecom network, and the like, or a combination thereof Files 17 may be made accessible to second computer 20, e.g. via data network 100, only through the use of a predetermined, specific user name and a predetermined, specific user password. The user name and user password are typically determined before an attempt is made to access files 17. In an embodiment, the user name and user password are determined from a login form. In other embodiments, the user name and user password are determined from either data within first computer 10 and/or second computer 20, data accessible via data network 100 such as Active Directory information, or the like, or a combination thereof.

First computer 10 initiates server pipe service software 310, either automatically after a triggering event, manually, or the like, or a combination thereof. Server pipe service software 310 is accessible, e.g. to second computer 20, over server named pipe 311 which comprises predetermined server pipe name 313. In typical embodiments, database manager 300 and server pipe service software 310 are separate processes operating in first computer 10.

Second computer 20 initiates client pipe service software 320, either automatically after a triggering event, manually, or the like, or a combination thereof. Second computer 20 uses client pipe service software 320 to request a connection via server pipe service software 310 to first computer 10 by using client pipe service software 320 to establish a connection to server pipe service software 310 using server named pipe 311. In a preferred embodiment, establishing this connection comprises sending server pipe service software 310 message 400 (FIG. 6) which comprises client pipe service token 322 which is specific to second computer 20. In certain embodiments, a predetermined set of user related data may be appended to message 400 prior to its being sent, e.g. a user identifier and a file identifier. Moreover, the user identifier may be required to be associated with sufficient permission to access data associated with the file identifier as part of validating the received client pipe service token 322 against the predetermined set of valid tokens.

Client pipe service token 322 is received by server pipe service software 310 over server named pipe 311 and the received client pipe service token 322 is then validated at first computer 10 against a predetermined set of valid client pipe service tokens 322. The received client pipe service token 322 is typically validated at first computer 10 by server pipe service software 310. The validation process may include a query session between server pipe service software 310 and database manager 300.

If received client pipe service token 322 is not validated, the connection over server named pipe 313 is terminated for that request from second computer 20. A subsequent request may be validated, either from second computer 20 or from another computer, depending on receipt of a valid client pipe service token 322.

If received client pipe service token 322 is validated by first computer 10, first computer 10 sends server pipe service token 312 to client pipe service software 320 over server named pipe 311, basically as an ACK, and waits for a further message 400 (FIG. 6) from client pipe service software 320. Client pipe service software 320 creates second pipe 321 with a new predetermined second pipe name 323 where second pipe name 323 is known to first computer 10, e.g. second pipe name 323 is based on and/or comprises client pipe service token 322. To help insure that second pipe 321 is created and operational, second computer 20 may create message 400 comprising server pipe service token 312 and send message 400 to server pipe service software 310 from client pipe service software 320 over either first pipe 311 or second pipe 321 to indicate that second pipe 321 is ready for communication and that second computer 20 is waiting for an acknowledgement message 400 from first computer 10.

An indication of whether client pipe service software 320 desires to obtain data from server pipe service software 310 or provide data to server pipe service software 310 may be included as all or part of message 400 (FIG. 6). When message 400 comprises a desire to provide data to server pipe service software 310, second computer 20 may provide server pipe service software 310 with a file name to be used for file 17 to be created at first computer 10 using the provided data as well as provide server pipe service software 310 with data sufficient to identify a location at first computer 10 at which to create file 17. This message may comprise various additional data, including, by way of example and not limitation, the length of the file to be sent to the server so the server can verify it received all pertinent data.

Prior to creating file 17, first computer 10 may validate the file name and the predetermined file location, and only allowing creation of file 17 if the file name and the predetermined file location are validated. The validation may comprise a validation by server pipe service software 310.

First computer 10 sends an acknowledgement message which, if the request is to obtain a file, may comprise various additional data, including, by way of example and not limitation, the length of the file to be sent to the client so the client can verify it received all pertinent data. The message may comprise a "begin transmission" or "begin reception" message 400 (FIG. 6) sent to client pipe service software 320 from server pipe service software 310 which, upon being received by client pipe service software 320, triggers second computer 20 to initiate the desired file operation over second pipe 321, e.g. a data transfer to or from first computer 10. In this embodiment, all data are transferred using pipe I/O, but the messaging may be similar in more than this embodiment.

The predetermined, specific file operation may be trapped in a computer program operatively resident in second computer 20 when the computer program requests the predetermined, specific file operation, e.g. by adding software responsive to an event raised by the computer program to accomplish the predetermined, specific file operation. For example, trapping may be accomplished by a software module integrated into at least one of a computer operating system or the computer program responsive to an event raised by the computer program to accomplish the predetermined, specific file operation.

If the data transfer is completed successfully, the transferring computer sends a successful transfer message 400 (FIG. 6) between server pipe service software 310 and the client pipe service.

Referring now to FIG. 1 and FIG. 4, in a second embodiment files 17 accessible to a computer operating system are managed by isolating a set of managed folders at first computer 10 from direct access by a user of second computer 20. These managed folders comprise a set of managed files 17 associated with the managed folders, where the set can be empty. A set of item attributes may be assigned from a predetermined set of global item attributes to each managed folder and each managed folder populated with a set of managed folder items which may comprise files 17, folders, links to files 17 and/or folders, or the like, or a combination thereof. These item attributes may comprise read access, write access, deletion access, move access, export access, and the like, or combinations thereof. Each managed folder item may also be associated as well with a subset of the set of item attributes and with a set of searchable attributes for each managed folder item.

A software module is integrated into a software application at second computer 20, e.g. a word processing or email software application, and hooks into a predetermined set of software application events, allowing the file operation if the user has appropriate permissions to perform the file operation by trapping a file operation request made by the software module at second computer 20 to effect the file operation at the software application event level. The access software is adapted and configured to selectively and temporarily map the predetermined portion of data store 15 as temporary link 25 when the file operation is desired by second computer 20 with respect to a file to be managed. For example, the access software can set a logical route to a predetermined folder or set of folders resident in data store 15 and map that logical route to a drive designator, e.g. the "N:" drive, as temporary link 25.

If it is verified that the user has appropriate permissions to perform the desired file operation, a temporarily enabled secured logical path to first computer 10, temporary link 25, is created from second computer 20 and the file operation allowed over temporary link 25 to first computer 10, e.g. a temporary mapping of a predetermined folder at first computer 10 to a logical drive designator, e.g. "N:". Upon completion of the requested operation, temporary link is dissolved or otherwise removed.

In certain embodiments, creation of temporary link 25 comprises initiating server pipe service software 310 at first computer 10, where server pipe service software 310 is accessible over predetermined server named pipe 311. Server pipe service software 310 may be initiated on a more-or-less permanent, on demand, and/or periodic basis. Client pipe service software 320 is initiated at second computer 20, typically on demand, and a connection to first computer 10 by second computer 20 is requested by using client pipe service software 320 to establish a connection to server pipe service software 310 using server named pipe 311. Establishing this connection typically comprises sending message 400 (FIG. 6) comprising client pipe service token 322 to server pipe service software 310; receiving message 400 from client pipe service software 320 by server pipe service software 310; validating the received client pipe service token 322 at first computer 10 against a predetermined set of valid client pipe service tokens 322 typically created during system installation; and allowing creation of temporary link 25 only if the received client pipe service token 322 is validated.

In a version of this embodiment, a software application executing in second computer 20 first queries database manager 300 to determine if second computer 20 has adequate permission to perform a predetermined, specific file operation with respect to a file that is a member of the set of files having limited accessibility. If second computer 20 has adequate permission, second computer 20 initiates temporary link 25 to the set of files 17 having limited accessibility when the predetermined, specific file operation is requested at second computer 20.

Once temporary link 25 is established, second computer 20 performs the predetermined, specific file operation and software operative in either or both of first computer 10 and/or second computer 20 updates table 13 managed by database manager 300 with the completed status of the predetermined, specific file operation. In this embodiment, file transfers occur over temporary link 25 such as by using operating system file transfer methods.

Whether or not successful, upon completion of the predetermined, specific file operation, second computer 20 terminates temporary link 25.

Referring now to FIG. 1 and FIG. 5, in a third embodiment, as opposed to the methods described above driver-based disk mapper 326 is initiated at second computer 20, where driver-based disk mapper 326 creates a mapped pseudo-disk drive 26 at second computer 20. For example, the user (and, by implication, software operative in second computer 20) may see drive "N:" at second computer 20 and the software executing in second computer 20 may operate as if drive "N:" is a physical drive, but drive "N:" is only accessible via driver-based disk mapper 326 to emulate a physical drive, e.g. mapped pseudo-disk drive 26.

Software executing at second computer 20 attempts a file operation on a file 17 of the set of files 17 having limited accessibility at second computer 20 via pseudo-disk drive 26, e.g. attempts to open file 17. Upon receipt of the file operation request, driver-based disk mapper 326 connects to server pipe service software 310 to establish whether or not second computer 20 is a valid, registered computer using message 400 (FIG. 6) which comprises client pipe service token 322. If second computer 20 is a valid, registered computer, driver-based disk mapper 326 queries database manager 300 to determine if second computer 20 has adequate permission to perform the specific, requested file operation with respect to file 17 of the set of files 17 having limited accessibility. If second computer 20 has adequate permission, driver-based disk mapper 326 allows the completion of the specific requested file operation between first computer 10 and second computer 20 via pseudo-disk drive 26, e.g. using computer operating system file transfer methods.

As opposed to the other methods described herein, pseudo-disk drive 26 is not temporary link 25 and allows for files 17 to be managed without having a software module integrated into an application at second computer 20. Thus, if a software module integrated into an application at second computer 20 does try to open a managed file 17 using pseudo-disk drive 26, that software module can identify itself to pseudo-disk drive 26, e.g. via a token or other message, and pseudo-disk drive 26 can then let the software module access managed file 17 as described herein. If, however, a file operation request is made through pseudo-disk drive 26 from other than a software module that is part of system 1, pseudo-disk drive 26 can present one or more forms to the user at second computer 20 to gather information required by system 1 for managed files, e.g. file description data, user description data, and the like. Pseudo-disk drive 26 can then perform many if not all of the functions required, as described herein, which normally would be performed by the software module that is part of system 1.

Further, as will be understood by those of ordinary skill in the software and computer networking arts, because pseudo-disk drive 26 represents a logical path, it can provide a secure path to so-called Cloud resources, e.g. servers 10 accessible over the Internet.

As with the other embodiments, table 13, managed by database manager 300, is updated with the completed status of the specific file operation.

As should be apparent to those of ordinary skill in the computer software arts, table 13 may be one or more tables 13; database 12 may be one or more databases 12*a*, 12*b*, 12*c*; file 17 may be an unmanaged file or a managed file, as context dictates (although usually file 17 indicates a managed file herein); and folder may be one or more folders or subfolders.

Further, rather than used named pipes, as mentioned above other processes may be substituted such as DCOM servers/clients and Windows Sockets servers/clients.

As noted above, application software, for example legal research software or eDiscovery software, may be modified and tailored specifically to interface with system 1 such that its file operations are also to be performed with respect to a managed folder and/or managed file 17 in the manners described in the various embodiments herein.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A system for providing managed document access in a computer network, comprising:
   a) a first computer operating as a file server, the first computer operatively in communication with a data network, the first computer comprising:
      i) a data store;
      ii) a first unique identifier usable as a server token and immutably associated with a hardware component of the first computer's hardware;
      iii) a set of managed files to be managed resident on the data store;
      iv) database management software operationally resident in the first computer; and
      v) server service software operationally resident in the first computer, the server service software configured to validate a client computer's token against a predetermined set of valid client computer tokens, the server service software comprising:
         1. a predetermined data communications access path independent of the first unique identifier; and 2. a module configured to communicate over a unique client data communications access path; and b) a second computer operatively in communication with the data network, the set of managed files having limited accessibility to the second computer via the data network, the second computer comprising:

i) a second unique identifier usable as a client computer token, the second unique identifier immutably associated with a hardware component of the second computer's hardware;

ii) client service software operationally resident in the second computer, the client service software configured to:

(1) communicate with the first computer over the data network using the predetermined data communications access path and to provide the server service software with the second unique identifier; and (2) communicate with the server service software over the data network using both the first unique identifier and the second unique identifier over the unique client data communications access path; and iii) a driver-based disk mapper configured to create a pseudo-disk software service which emulates a hard drive to provide managed access to the set of managed files resident on the data store using the client service software.

2. A method of providing managed document access in a computer network for a system for providing managed document access in a computer network, the system comprising a first computer, operating as a server and operatively in communication with a data network, where the first computer comprises a data store, a first unique identifier usable as a server token and immutably associated with a hardware component of the first computer's hardware, a set of managed files resident on the data store, a database manager comprising database management software operationally resident in the first computer, and server service software operationally resident in the first computer where the server service software is configured to communicate over a predetermined data communications access path independent of the first unique identifier, to validate a client computer's token against a predetermined set of valid client computer tokens, and to communicate over a unique client data communications access path, and a second computer, operatively in communication with the data network, where the second computer has limited access to the set of managed files via the data network and comprises a second unique identifier usable as a client computer token, the second unique identifier immutably associated with a hardware component of the second computer's hardware, client service software operationally resident in the second computer and configured to communicate with the first computer over the data network using the predetermined data communications access path, provide the server service software with the second unique identifier and communicate with the server service software over the data network using both the first unique identifier and the second unique identifier over the unique client data communications access path, and a driver-based disk mapper configured to create a pseudo-disk software service which emulates a hard drive to provide managed access to the set of managed files resident on the data store using the client service software, the method comprising:

a) initiating the driver-based disk mapper at the second computer;

b) using the driver-based disk mapper to create a mapped pseudo-disk drive at the second computer;

c) emulating a physical disk drive via the mapped pseudo-disk drive;

d) using the mapped pseudo-disk drive to intercept a file operation request for a managed file of the set of managed files resident at the first computer where the set of managed files has limited accessibility at the second computer;

e) upon receipt of the file operation request, using the driver-based disk mapper to connect to the first computer over the data network using the predetermined data communications access path to establish whether or not the second computer is a valid, registered computer by sending a client message comprising the second unique identifier to the first computer;

f) validating the client message at the first computer by using the server service software to compare the client computer token contained in the second unique identifier against the predetermined set of valid client computer tokens;

g) if the second unique identifier is present in the predetermined set of valid client computer tokens and associated with a valid, registered computer, sending a validation message to the second computer from the first computer, the validation message comprising the first unique identifier, and establishing the unique client data communications access path;

h) if validated, using the driver-based disk mapper to query the database manager over the unique client data communications access path to determine if the second computer has adequate permission to perform the file operation request with respect to the managed file of the set of managed files having limited accessibility; and i) if the second computer has adequate permission, using the driver-based disk mapper to complete the file operation request.

3. The method of providing managed document access in a computer network of claim 2, wherein the pseudo-disk drive is not mounted as a temporary link and then dismounted after the completion of the file operation request.

4. The method of providing managed document access in a computer network of claim 2, wherein the pseudo-disk drive allows a set of file operations to be performed with respect to the set of managed files without having a specific managed document access software module integrated into a software application at the second computer which issues the file operation request.

5. The method of providing managed document access in a computer network of claim 4, wherein the file operation request is made by the software application through the pseudo-disk drive by:

a) using the pseudo-disk drive to acquire further information from the second computer required for managed files access once the file operation request is received by the driver-based disk mapper;

b) forwarding required information to the first computer for access verification by the first computer; and c) allowing the requested file operation if access is verified by the first computer.

6. The method of providing managed document access in a computer network of claim 5, wherein the further information is acquired by using the pseudo-disk drive to present a form to a user at the second computer and allowing the file operation request to be entered into the form.

7. The method of providing managed document access in a computer network of claim 2, further comprising:
   a) allowing a software module integrated into an application at the second computer to identify itself to the pseudo-disk drive and request a file operation on a managed file using the pseudo-disk drive; and
   b) if the software module is authorized as a result of its identification, using the pseudo-disk drive to allow the requested file operation on the managed file to proceed.

8. The method of providing managed document access in a computer network of claim 2, wherein a pseudo-disk drive created by the driver-based disk-mapper comprises a logical path comprising a secure path to a Cloud resource.

9. The method of providing managed document access in a computer network of claim 2, wherein the driver-based disk mapper connects to the first computer to establish whether or not the second computer is a valid, registered computer by sending a message to the first computer where the message comprises the second unique identifier and creating a mapped pseudo-disk drive further comprises:
   a) initiating a data communication service at the first computer, the data communication service accessible using the predetermined data communications access path;
   b) initiating a complementary client data communication service at the second computer;
   c) establishing a data connection from the first computer by the second computer over the predetermined data communications access path, the establishing comprising the second computer sending the client message to the first computer over the predetermined data communications access path;
   d) stripping the received client computer token from the client message by the first computer;
   e) validating the stripped client computer token at the first computer against a predetermined set of valid client pipe service tokens;
   f) creating a unique client data communications access path between the first computer and the second computer;
   g) sending a validation message from the first computer to the second computer over the predetermined data communications access path, the validation message comprising an identifier for the unique client data communications access path between the first computer and the second computer, the identifier comprising a client pipe service token;
   h) mapping the pseudo-disk drive only if the received client pipe service token is validated; and
   i) using the unique client data communications access path between the first computer and the second computer for data transfers to and from the first computer via the pseudo-disk drive.

10. The method of providing managed document access in a computer network for a system for providing managed document access in a computer network of claim 9, further comprising closing the unique client data communications access path between the first computer and the second computer once a requested operation has completed.

11. The method of providing managed document access in a computer network for a system for providing managed document access in a computer network of claim 9, further comprising encrypting data transferred from the first computer to the second computer using the second unique identifier.

12. The method of providing managed document access in a computer network for a system for providing managed document access in a computer network of claim 2, further comprising trapping the file operation request in a computer program operatively resident in the second computer when the computer program makes the file operation request.

13. The method of providing managed document access in a computer network for a system for providing managed document access in a computer network of claim 12, wherein the trapping is accomplished by a software module integrated into at least one of a computer operating system or the computer program.

14. The method of providing managed document access in a computer network for a system for providing managed document access in a computer network of claim 2, further comprising:
   a) creating a set of related tables in a database, the set of related tables comprising data regarding each managed folder and each managed folder item;
   b) adding a predetermined set of file records to the set of related tables, the predetermined set of file records comprising data sufficient to identify the set of managed files having limited accessibility;
   c) isolating a set of managed folders from direct access by a user of an operating system currently executing in the first computer, the managed folders being populated by the set of managed files having limited accessibility;
   d) assigning a set of item attributes from a set of global item attributes to each managed folder;
   e) associating each managed folder item with a subset of the set of item attributes;
   f) associating a set of searchable attributes with each managed folder item;
   g) creating a set of users who will have access to managed folders and managed files;
   h) assigning a set of permissions to each user in the set of users, the permissions comprising a read permission, a write permission, a delete permission, and a view permission;
   i) designating a file as a linked file which is physically not present but which is logically linked to a physical file of the set of managed files;
   j) performing the file operation as requested against the linked file irrespective of the associated managed folder; and
   k) allowing deletion of the linked file only if it is the only remaining file associated with a single managed folder.

15. The method of providing managed document access in a computer network for a system for providing managed document access in a computer network of claim 14, further comprising:
   a) providing a linked file item attribute as part of the set of item attributes;
   b) allowing a user with appropriate permissions to mark a file item as a linked file item;
   c) allowing a user with appropriate permissions to associate a linked file item with a set of managed folders: and
   d) displaying the linked file item as a member of each associated member of the set of managed folders.

16. The method of providing managed document access in a computer network for a system for providing managed document access in a computer network of claim 15, further comprising:
   a) allowing a user to freeze a version of the linked file item;

b) creating a new copy of the frozen linked file item with a new version identified for the linked file item; and c) associating the new copy of the frozen linked file item with a selected managed folder.

17. The method of providing managed document access in a computer network for a system for providing managed document access in a computer network of claim 2, further comprising:

a) allowing a user to specify file versioning, each version of a managed file comprising a separate instance of a versioned managed file; and b) allowing a user to request a new version of a managed file.

18. The method of providing managed document access in a computer network for a system for providing managed document access in a computer network of claim 2, further comprising allowing a user at a verified second computer to locate a managed folder by presenting the user with a folder searching form and using search criteria entries from the folder searching form to locate managed folders meeting a set of search criteria entered by the user using the folder searching form.

19. The method of providing managed document access in a computer network for a system for providing managed document access in a computer network claim 2, further comprising:

a) extracting text content from a file to be stored at the first computer as a managed computer; and b) storing the extracted text content in a text searchable record associated with the file to be stored at the first computer in a table managed by the database manager.

* * * * *